INVENTOR:
Albert B. Doran,
BY

ATTORNEY.

Oct. 25, 1932.  A. B. DORAN  1,883,884
PHOTOGRAPHIC SENSITOMETER
Filed Feb. 9, 1931    5 Sheets-Sheet 4

INVENTOR:
Albert B. Doran,
BY
ATTORNEY.

Patented Oct. 25, 1932

1,883,884

UNITED STATES PATENT OFFICE

ALBERT B. DORAN, OF LOS ANGELES, CALIFORNIA, ASSIGNOR TO HUGHES DEVELOPMENT COMPANY, LTD., OF LOS ANGELES, CALIFORNIA, A CORPORATION OF CALIFORNIA

PHOTOGRAPHIC SENSITOMETER

Application filed February 9, 1931. Serial No. 514,677.

My invention relates to a sensitometric device for determining the characteristics of photographically sensitive material, such as photographic plates and film having sensitized emulsion coatings thereon.

My invention is of especial utility in the motion picture industry wherein it is useful in comparing the sensitivity of photographic negative and positive stock with a known standard, comparing the exposure to which a photographic member has been subjected with a known standard, determining the desired degree of development to be employed, and for comparing with a known standard the results obtained in developing an exposed sensitized member. In view of the fact that the invention is especially adapted for use in the motion picture industry, I shall herein disclose an embodiment of my invention especially adapted for use with motion picture film, together with the advantages thereof, it being understood that where I have herein used the term "sensitized photographic member" or the equivalent, I am in general referring to photographic plates, film, and motion picture film, but that the specific reference is to motion picture film.

It is an object of my invention to provide a relatively simple, inexpensive, yet extremely efficient means for forming a sensitometric strip from a sensitized photographic member adapted for use in the practice of sensitometry. In this device I provide a means for projecting a beam of light onto a sensitized photographic member, this beam of light being of constant intensity throughout its entire cross sectional area, and a sensitometric tablet adapted to be interposed in the path of the beam of light in such a manner that desired systematic gradations in the intensity of the beam of light are obtained, whereby to produce corresponding decreases of exposure in the divisional areas of the sensitized photographic member. This sensitometric tablet has a plurality of translucent, semiopaque light filters placed side by side so as to occupy an area substantially equal to the cross sectional area of the light beam and the area of the sensitized photographic member to be employed in making a sensitometric test. These light filters are preferably of neutral tint and have the function of reducing the volume of light passing therethrough by changing the intensity of the respective portions of the original light beam which impinges thereon, the duration of time of the respective portions of the light beam being the same by reason of the fact that they are derived from a single original light beam.

A further object of the invention is to provide a simple means for controlling the projection of a light beam in such a manner that at each operation of the device a light beam of predetermined intensity and duration will be obtained.

Further objects and advantages of the invention will be made evident throughout the following part of the specification.

Referring to the drawings, which are for illustrative purposes only.

Figure 1:
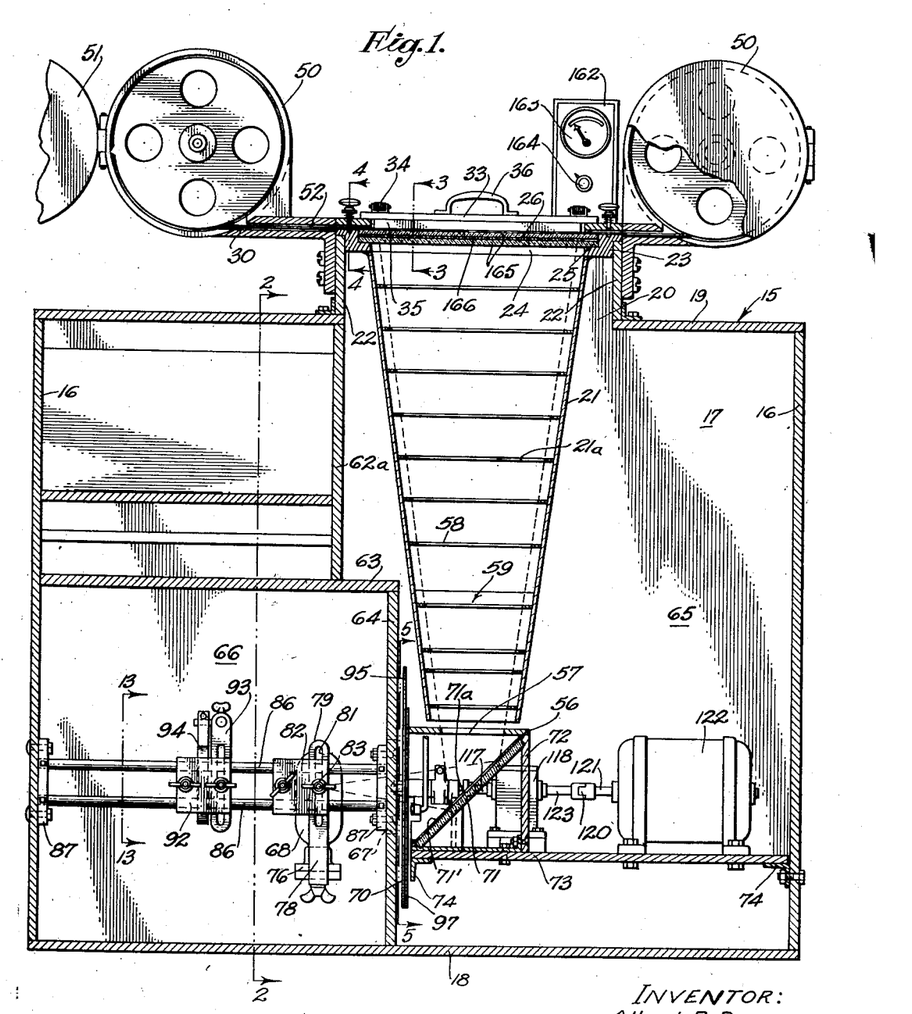
Fig. 1 is a vertical longitudinal section through the preferred embodiment of my invention.
Figure 3:
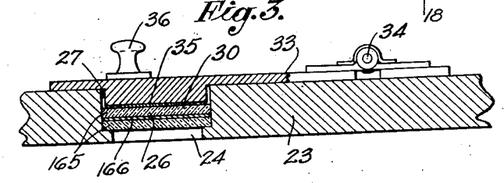
Fig. 3 is an enlarged fragmental cross section on a plane represented by the line 3—3 of Fig. 1.
Figure 4:
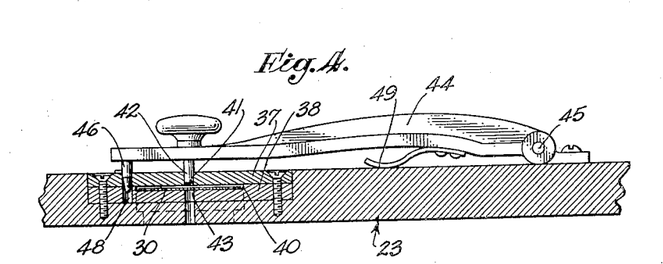
Fig. 4 is a fragmentary cross section on a plane represented by the line 4—4 of Fig. 1.

In the simple embodiment of my invention shown in Fig. 1, I employ a housing 15 having side walls 16 and 17, a bottom 18, and a top 19 equipped with an opening 20 in which a light column 21 is supported. The opening 20 is defined by walls 22 across which a flat table member 23 is extended. The member 23 has an opening 24 somewhat narrower than a standard motion picture film and of considerable length as compared with its width. The upper portion is provided with a rabbet 25 adapted to receive and support a sensitometric tablet 26. As shown in Fig. 3, a groove 27 extends across and above the sensitometric tablet 26, this groove receiving the sensitized photographic member 30 or motion picture film from which a sensitometric strip is to be made. A cover 33 is hinged to the top of the member 23 by means of spring hinges 34 and is of such size that it will extend over the groove 27. A filler strip 35 is secured to the under face of the cover in position to enter the groove 27 and to hold the sensitized photographic member 30 down against the upper face of the sensitometric tablet 26, a handle 36 being provided for lifting the cover 33. As shown in Fig. 4, pairs of metal plates 37 and 38 are set into the upper face of the member 23 in position aligned with the ends of the groove 27, and between each of these pairs of plates 37 and 38 an aperture 40 is formed through which the film 30 is threaded. Each upper plate 37 is provided with an opening 41 through which a punch 42 extend, and below each opening 41 an opening 43 is formed in a lower plate 38 so that the lower plate will cooperate with the punch as a die. Accordingly, there is a punch 42 situated at each end of the member 23, and each of these punches 42 is mounted on an arm 44 supported by a hinge 45 so that the punch may be swung rearwardly out of engagement with the opening 41. On the forward end of each arm 44 is a guide pin 46 which enters a guide opening 48 formed in the plates 37 and 38, so as to guide the outer end of the arm 44 and align the punch 42 with the opening 41 as the arm 44 is lowered into the position thereof shown in Fig. 4. Each of the levers 44 is equipped with a spring 49 for resiliently supporting same in partly raised position, whereby to hold the associated punch 42 in a position of disengagement with the film 30. As shown in Fig. 1, film reel magazines 50 may be mounted at the ends of the member 23, these magazines being substantially light-tight and having side doors 51 and light-tight film channels 52 aligned with the openings 40 formed between the plates 37 and 38.

The light column 21 converges downwardly toward a mirror box or housing 72 having an upper wall 56 with a rectangular aperture 57 therein through which light is reflected from a mirror 71 into the interior of the light column which is equipped with a series of baffle walls 58 having baffle apertures 59 therein, these apertures increasing gradually in size from a minimum rectangular opening in the wall 58 situated at the lower end of the light column to a maximum opening in the wall 58 situated at the upper end of the light column.

The mirror 71 is provided with a mask 71' having a narrow rectangular opening 71a therein. This mask is made of a material having minimum light reflecting characteristics, such as black plush. Therefore, the only portion of a light beam directed laterally toward the mirror reflected upwardly through the light column 21 is a small predetermined rectangular area. The baffle walls 56 and 58 are substantially non-reflective in character and to this end may be made of a dull black material or coated with a dull black paint. Stray light rays impinge against these baffle walls and are absorbed thereby. Therefore, the beam of light which reaches the opening 24 is of constant intensity throughout its entire area.

Figure 2:
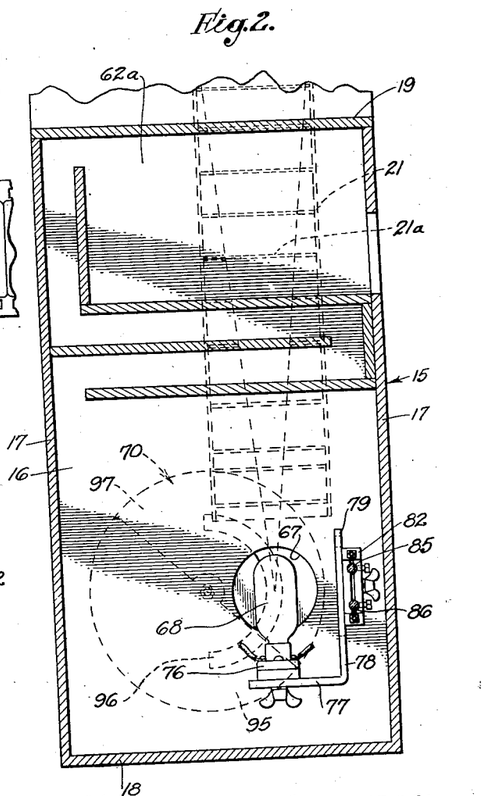
Fig. 2 is a vertical cross section on a plane represented by the line 2—2 of Fig. 1.

The housing 15 is divided by walls 62a, 63, and 64 into right and left compartments 65 and 66. The light column 21 is in the compartment 65 and receives no light except that which enters through an aperture 67 in the wall 64 from a lamp 68 supported in the lower portion of the leftward compartment 66. A shutter 70 controls the admission of light to the lower end of the column 21, and when such shutter is in open position, light rays produced by the lamp 68 pass through the aperture 67 and are reflected upwardly through the light column 21 by the reflecting mirror 71 set at an angle of substantially 45° in the housing 72 situated at the lower end of the light column 21 and supported on a plate 73 which is carried on horizontal angles 74 in the lower part of the rightward compartment 65. Although the shutter may be placed so as to interrupt the light beam at any point, I prefer to place it in the position shown. The lamp 68, as shown in Figs. 1 and 2, is supported in a socket 76 slidably mounted on the horizontal lower plate 77 of a bracket 78. This bracket 78 has a vertical leg or plate 79 which is slotted as indicated at 81 and is held to a slide block 82 by means of a clamping screw and nut 83. The block 82 has horizontal openings 85 therethrough which receive horizontal guide bars 86 which are extended between supports 87 mounted within the leftward compartment 66.

The block 82 may be moved horizontally relative to the mirror 71. The filament of the lamp may be brought into centralized or focal position by moving the bracket 78 upwardly or downwardly relative to the block 82 and by moving the socket 76 horizontally on the arm 77 of the bracket 78. The horizontal bars 86 also support a slide block 92 which is of substantially the same construction as the block 82 and supports a bracket 93 which in turn adjustably supports a reflector 94. The reflector 94 may be readily moved or adjusted into such position that it will reflect light rays in a desired focus through the aperture 67 and onto the mirror 71.

Figure 5:
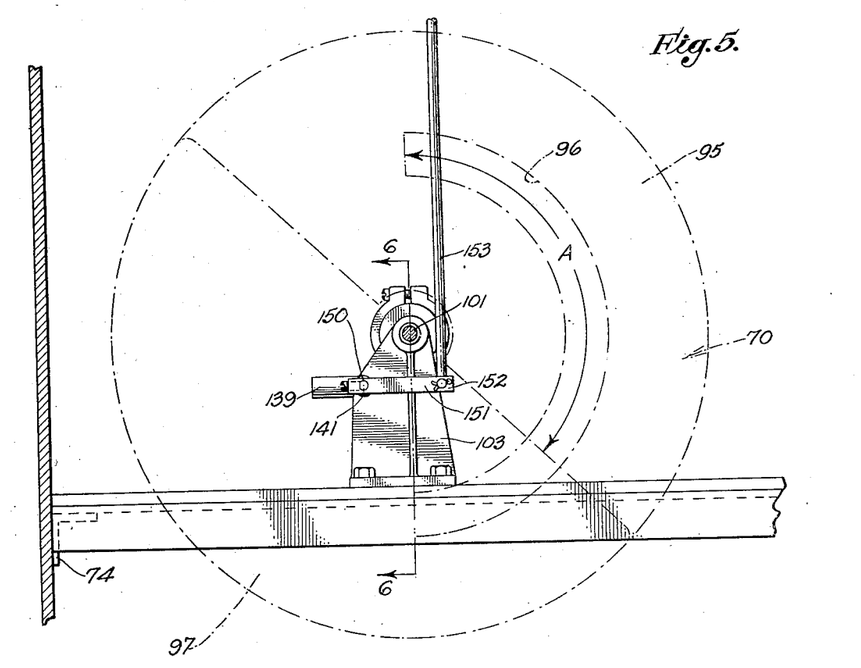
Fig. 5 is an enlarged elevational view derived on a plane represented by the line 5—5 of Fig. 1.

The shutter 70 consists of a circular plate 95 having an arcuate opening 96 therein, this opening extending through an angle of substantially 180°, and a movable plate 97. The members 95 and 97 are mounted on the diametrally reduced end 100 of a shaft 101 which is carried in a bore 102 formed in a bracket 103 which is supported on the plate 73 within the compartment 65. The members 95 and 97 are turnable upon the end 100 of the shaft 101 and are adapted to be clamped between washers 105 which are forced together by means of a nut 106 having a lock washer 107 thereunder. A feature of this shutter 70 is that the members 95 and 97 thereof may be rotated relative to each other so as to vary the angular dimension or length A of the shutter opening. In order to establish a definite entrance of light into the lower end of the column 21, the angle A is proportioned relative to the intensity of the light received from the lamp 68 in such a manner that the product of the area, density, and duration of the entering beam of light is established at a desired value.

Figures 6, 7, 8, 9, 10:
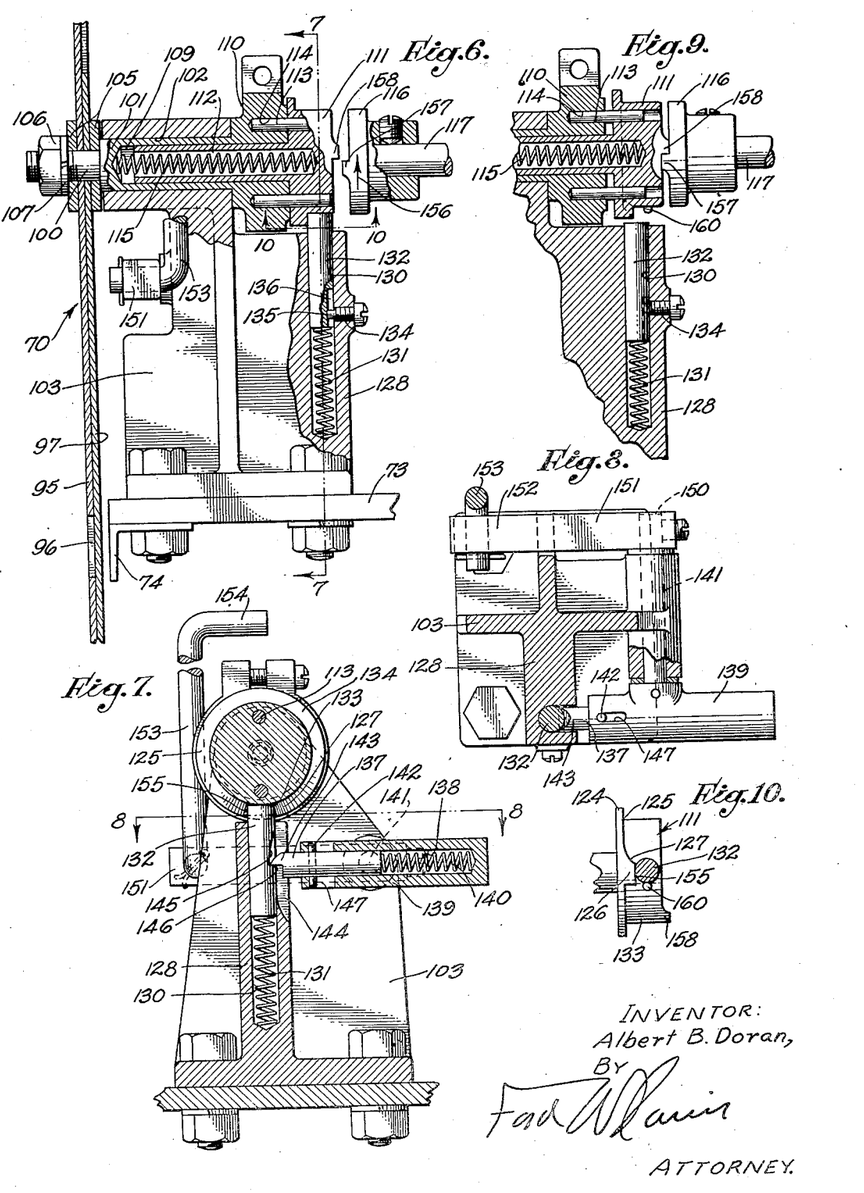
Fig. 6 is an enlarged fragmentary sectional view taken on a plane represented by the line 6—6 of Fig. 5.
Fig. 7 is a fragmentary cross section on a plane represented by the line 7—7 of Fig. 6.
Fig. 8 is a cross section on a plane represented by the line 8—8 of Fig. 7.
Fig. 9 is a fragmentary sectional view showing the clutch mechanism of the shutter actuating means in engaged position.
Fig. 10 is a fragmentary sectional view derived on a plane represented by the line 10—10 of Fig. 6 and looking upwardly toward the movable body of the clutch mechanism.

As shown best in Fig. 6, the shaft 101 has an axial bore 109 extending inwardly from its rightward end and has a head or body 110 formed at its rightward end. An axially movable clutch member 111 is provided with a hollow extension 112 adapted to fit into the bore or recess 109 of the shaft 101. Rotation of the clutch member 111 relative to the shaft 101 is prevented by pins 113 which project from the clutch member 111 into openings 114 in the head 110 of the shaft 101. A spring 115 is placed within the hollow extension 112 and engages the inner end of the bore 109 so that the expansion of the spring will force the clutch member 111 outwardly or rightwardly toward a driving clutch member 116 mounted on the leftward end of a shaft 117 which extends from a reducing gear box 118 in axial alignment with the shaft 101. Through a flexible coupling 120, the shaft 121 of a motor 122 drives a shaft 123 which projects rightwardly from the gear box 118 and is connected to the shaft 117 through reducing gears, not shown in view of the fact that reducing gear mechanisms are old in the art.

As best shown in Fig. 10, the clutch member 111 is provided with a flange 124 having a radial cam face 125. A greater portion of the cam face 125 lies in a vertical plane but is provided with an abutment 126 approached by a sloping portion 127. In a web 128 of the bracket 103 a vertical hole 130 is drilled, and in this vertical hole a spring 131 is placed below a controlling member or pin 132, the upper end of which is adapted to lie adjacent the cam face 125 and to rest against the cylindrical portion 133 of the clutch member 111. A screw 134 is provided to prevent rotation of the pin 132 and has a dog point 135 adapted to engage a slot 136 cut in the cylindrical face of the pin 132 near its lower end. A releasing dog 137 is slidably mounted in a bore 138 formed in a lever 139 which is mounted on the end of a shaft 141 which is supported by the bracket 103 in horizontal position and substantially parallel to the shaft 101. A spring 140 in the inner end of the bore 138 forces the dog 137 outwardly toward its extreme outward position which is determined by a stop pin 142 which extends through the dog 137 and has its ends sliding in a groove 147 in the forward end of the lever 139.

With reference to Fig. 7, the leftward or outer end of the releasing dog 137 is provided with a shoulder 143 and projects through a vertical slot 144 cut in the upper portion of the web 128. The outer end of the releasing dog 137 is adapted to engage a notch 145 in the controlling pin 132 in the manner shown in Fig. 7. When the lever 139 is rotated in anti-clockwise direction, the releasing dog 137 will swing downwardly and rightwardly, moving the pin 132 downwardly until the end of the dog 137 disengages the shoulder 146 of the notch 145 due to its downward and rightward arcuate movement. As soon as this disengagement takes place, the controlling pin 132 will snap up to its original position under action of the spring 131.

On the end 150 of the shaft 141 a lever 151 is secured, and from the swinging end 152 of the lever 151 an actuating bar 153 is extended upwardly to and through the top of the housing 15, there being a handle 154 on the upper end of the bar 153 which may be manually engaged and forced downwardly so as to swing the lever 151 downwardly and, through the medium of the shaft 141, to cause the lever 139 to swing downwardly and carry the member 137 through an operation.

In Figs. 6 and 7 I have shown the pin 132 in raised position with its top face in engagement with the cylindrical portion 133 of the clutch member 111. The upper extremity of the pin 132 is resting against the outer face 155 of the abutment 126 of the cam 124, holding the clutch member 111 in leftward position and disengaged from the clutch member 116. During this time the clutch member 116 is rotating in clockwise direction, as indicated by the arrow 156 in Fig. 6, but the tooth 157 of the clutch member 116 does not engage the tooth 158 of the clutch member 111. When it is desired to actuate the shutter 70, the lever 154 is depressed, this resulting in the pin 132 being moved downwardly to its position in Fig. 9, with the result that the upper end of the pin 132 moves downwardly from engagement with the outer face 155 of the abutment 126 and allows the clutch member 111 to snap in rightward direction under pressure of the spring 115, thereby moving the tooth 158 into the path of rotation of the tooth 157 so that the tooth 157 will engage the tooth 158, as shown in Fig. 9, and rotate the clutch member 111, the shaft 101, and the shutter 70 in clockwise direction. The releasing action of the dog 137 results in the pin 132 being returned to raised position immediately after rotation of the clutch member 111 has started so that the upper end of the pin 132 will rest in a position adjacent the face 125 of the cam 124. Then, as rotation of the clutch member 111 continues, the sloping approach 127 of the abutment 126 will engage the upper end of the pin 132 and cause the clutch member 111 to move leftwardly from engagement with the driving tooth 157 of the clutch member 116, the momentum of the shutter 70 being sufficient to carry the clutch member 111 forwardly after disengagement of the teeth 157 and 158 such a distance that the face 155 of the abutment 126 will rest against the upper end of the pin 132, as shown in Figs. 6, 7, and 10. To prevent the clutch member 111 from moving beyond this position, a stop pin 160 may be provided. This mechanism assures that only a single operation of the shutter will occur for each depression of the lever 154.

In the form of the invention shown, the motor runs at a constant speed of 1750 revolutions per minute, and the reduction gears in the gear box 118 are such that the shutter shaft 101 makes one revolution in 5.85 seconds. The shutter 70 may be adjusted to give a shutter opening having a dimension A between 90° and 270°, thereby making it possible to obtain a minimum exposure of 1.46 seconds and a maximum exposure of 4.38 seconds. The shutter may be adjusted anywhere within this range to suit the intensity of the lamp employed.

As shown in Fig. 1, a meter case 162 mounted in a visible position carries a watch meter 163 and a rheostat 164 which are connected to the lamp 68 in such a manner that the electrical power utilized by the lamp 68 may be noted and adjusted to a predetermined value, thereby making it possible to quickly check up on the machine and make the necessary adjustments which will assure the exposure of the sensitometric strips by a standard light condition.

In one utility of the device, such as to determine the proper solution for and time of development of a film stock or to determine whether the development is producing the proper gamma of the H and D curve commonly employed in sensitometry, a strip of raw or unexposed film stock is placed in what may be termed the film gate, or, in other words, in the slot 27, and the cover 33 is lowered thereover. The punches 42 are then caused to perforate the film so as to define the limits of the sensitometric strip.

Assuming that the motor 122 is running and that the rheostat 164 is adjusted to give the proper flow of current through the element of the lamp 68, the lever 154 is then depressed, causing actuation of the clutch 111 as previously herein described and the resultant single rotation of the shutter 70. A rectangular portion of the beam of light passed by the shutter is reflected upwardly by the mirror 71 and, passing through the light column 21, is evenly distributed over the entire area of the opening 24 in the member 23 and passes on through the sensitometric tablet 26 to expose the emulsion of the piece of film which is to be sensitometrically tested.

As shown in Figs. 1 and 3, the sensitometric tablet 26 consists of two rectangular pieces of optical glass 165 and a plurality of filters 166 placed therebetween in edge to edge engagement. These filters extend entirely across the width of the glass pieces 165 and have a dimension lengthwise of the pieces of optical glass equal to one-twentieth the length of the opening 24. These filters 166 are preferably of neutral tint material, but the essential feature of them is that they retard the passage of light in proportion to their respective densities and thus reduce the actinic value or capacity of the portions of the light for exposing the relative portions of the sensitized emulsion of the strip 30. Therefore, the original light beam passing upwardly from the light column 21 is varied in its exposure power in passing through the filters 166, with the result that the strip 30 is divided into areas each having a predetermined exposure or light produced chemical reaction in the silver salt contents of the emulsion. The filters 166 are regularly increased in density, preferably in the proportion of the square root of 2, with the result that the original light beam is proportionately reduced in exposure power passing through these filters to the strip 30.

Figure 11:
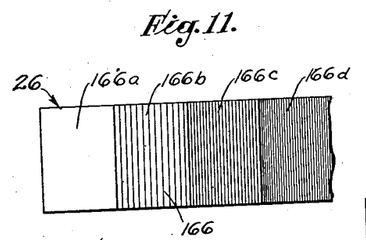
Fig. 11 is a face view of a portion of the sensitometric tablet employed in my device.
Figure 12:
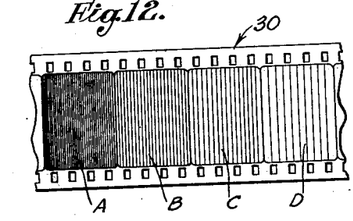
Fig. 12 illustrates a portion of a sensitometric record or strip obtained from the sensitometric tablet shown in Fig. 11.
Figure 13:
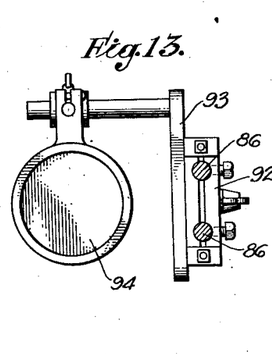
Fig. 13 is a fragmentary cross section on a plane represented by the line 13—13 of Fig. 1.

In Fig. 11 I show a face view of a portion of the sensitometric tablet 26. The first of the filters, indicated as 166a, may have no density, or at most a very small density. The succeeding filters 166b, 166c, and 166d, etc. are increased in density in proportion to the succeeding roots of 2. In Fig. 12 I show a portion of the strip 30 which has been exposed through the sensitometric tablet 26. This film strip comprises areas A, B, C, and D, etc., which decrease in density in the same proportion as the increase in density of the filters 166 through which the areas A, B, C, and D were exposed. By placing the film strip 30 in a photometer, the densities of these areas may be very accurately determined and a chart or H and D curve plotted therefrom, this H and D curve then being compared with a standard curve to note the senstitiveness or reaction of the emulsion to the actinic action of light, to note the degree of development to which the film strip has been subjected, to note the grain structure, and to obtain other accurate information relative to the emulsion and its treatment necessary to the production of standard photographic results both in the motion picture images and the sound track which may be printed therewith. Therefore, by means of my invention and use of the sensitometric tablet, I am able to consistently, by mathematical calculation from the sensitometric strips, determine the variable and normal factors of photographic emulsions and the treatment to which they are subjected in producing images. After having determined the characteristics of a photographic emulsion, I am able with a second strip exposed in a sensitometer to control the contrast of the development or to vary the chemical formula of the development to maintain a predetermined contrast in the exposed image. I also may with facility determine in advance the exhaustion point of a developing solution, or in color photography I may from the sensitometric strips control the contrast of the dyed image.

Figure 14:
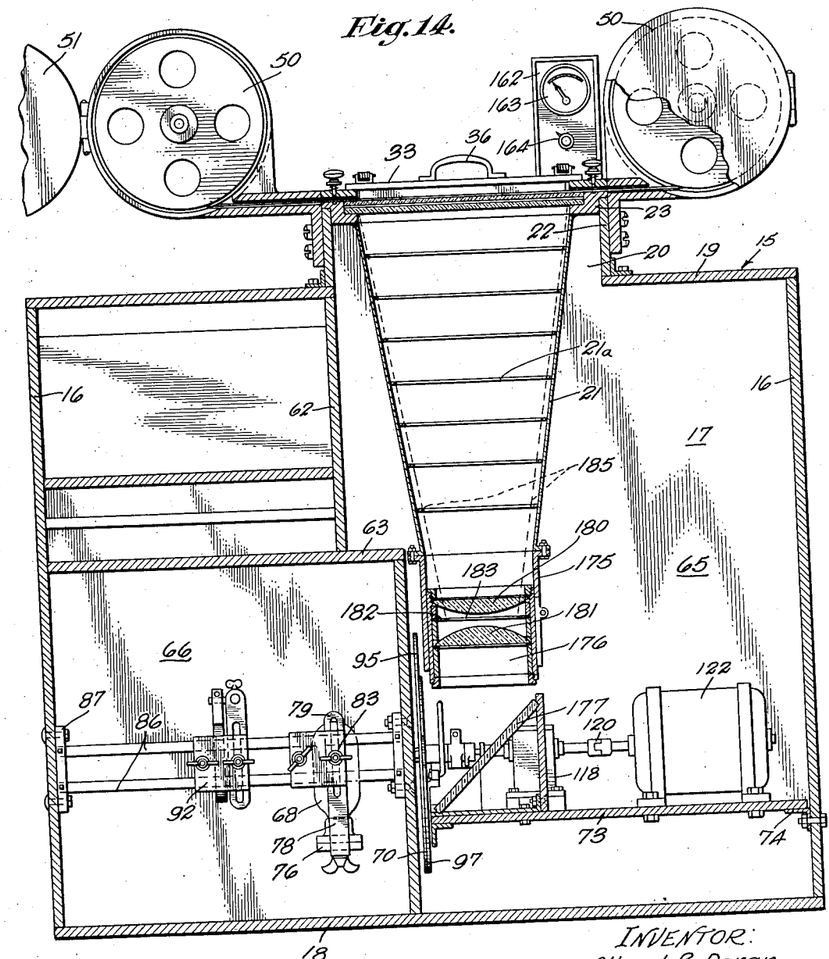
Fig. 14 is a sectional view similar to Fig. 1, showing the form of my invention in which the light beam is passed through a columnator.

In Fig. 14 I show my sensitometric device in a form identical to that disclosed in the preceding figures with the exception that the light column 21 includes a cylindrical shell 175 at its lower end supporting a columnator 176 for rectifying the rays of a beam of light which is reflected upwardly from a mirror 177. The columnator 176 includes an upper plano-convex lens 180 and a lower plano-convex lens 181, the upper lens 180 being of 17% longer focal length than the lower lens 181. Between the lenses 180 and 181 is an aperture plate 182 having a rectangular aperture 183 therein proportionate to the opening 24 in the member 23. On the side walls of the light column 21 are baffles 21a which slope downwardly and inwardly and are so placed as to pick up stray light rays at the sides of the light column. In this form of the invention I do not employ a mask on the mirror but determine the area of the light beam 185 by means of the aperture 183 in the plate 182.

Although I have herein shown and described my invention in simple and operative form, it is recognized that certain parts or elements thereof are representative of other parts, elements, or mechanisms which may be employed in substantially the same manner to accomplish substantially the same results; therefore, it is to be understood that the invention is not to be limited to the details disclosed herein but is to be accorded the full scope of the following claims.

I claim as my invention:

1. A sensitometric device of the character described, including: light means for projecting a beam of light to a sensitized photographic member; a sensitometric tablet interposed in the path of said light; and control means for said light means for controlling the intensity and duration of said beam of light.

2. A sensitometric device of the character described, including: light means for projecting a beam of light to a sensitized photographic member; beam directing means for making said beam of uniform cross-sectional intensity; a sensitometric tablet interposed in the path of said beam of light, said sensitometric tablet comprising a plurality of light retarding filters of regularly varied density for varying the intensity of cross sectional area portions of said beam of light so that the areas of said sensitized photographic member reached by said portions of said beam of light will respectively receive regularly varied degrees of exposure; and control means for said light means for controlling the intensity and duration of said beam of light.

3. A sensitometric device of the character described, including: light means for projecting a beam of light of uniform intensity throughout its cross-sectional area upon a sensitized photographic member; a sensitometric tablet interposed in the path of said beam of light, said sensitometric tablet comprising a plurality of light retarding filters of predetermined different densities for varying the intensity of cross sectional area portions of said beam of light so that the areas of said sensitized photographic member reached by said portions of said beam of light will respectively receive predetermined degrees of exposure; and control means for said light means for controlling the intensity and duration of said beam of light.

4. A sensitometric device of the character described, including: a housing; a sensitometric tablet in a wall of said housing; means for holding a sensitized photographic member in operative position relative to said tablet; a lamp in said housing adapted to project a light beam to said tablet; and a shutter of adjustable opening for controlling the passage of said light beam to said sensitometric tablet.

5. A sensitometric device of the character described, including: a housing; a sensitometric tablet in a wall of said housing; means for holding a sensitized photographic member in operative position relative to said tablet; a lamp in said housing adapted to project a light beam to said tablet; a shutter for controlling the passage of said light beam to said sensitometric tablet; a clutch member having one rotating part connected to said shutter; a constant speed power member connected to the other of the rotating parts of said clutch member; cam means for separating said rotating parts of said clutch member; and actuating means for freeing said cam means so as to permit engagement of said rotating parts of said clutch member.

6. A sensitometric device of the character described, including: a housing; a sensitometric tablet in a wall of said housing; means for holding a sensitized photographic member in operative position relative to said tablet; a lamp in said housing adapted to project a light beam to said tablet; a shutter for controlling the passage of said light beam to said sensitometric tablet; a clutch member having one rotating part connected to said shutter; a constant speed power member connected to the other of the rotating parts of said clutch member; cam means for separating said rotating parts of said clutch member; and clutch actuating means for producing engagement of said rotating parts through a predetermined angle of rotation.

7. A sensitometric device of the character described, including: a housing; a sensitometric tablet in a wall of said housing; means for holding a sensitized photographic member in operative position relative to said tablet; a lamp in said housing adapted to project a light beam to said tablet; a shutter for controlling the passage of said light beam to said sensitometric tablet; a clutch member having one rotating part connected to said shutter; a constant speed power member connected to the other of the rotating parts of said clutch member; cam means for separating said rotating parts of said clutch member; clutch actuating means for producing engagement of said rotating parts through a predetermined angle of rotation; and a manually actuated member for initiating the actuation of said clutch actuating means.

8. A sensitometric device of the character described, including: a housing; a sensitometric tablet in a wall of said housing; means for holding a sensitized photographic member in operative position relative to said tablet; a lamp in said housing adapted to project a light beam to said tablet; a shutter for controlling the passage of said light beam to said sensitometric tablet; a shutter shaft supporting said shutter; bearing means for said shutter shaft; a primary clutch member axially slidable on said shutter shaft; a power shaft; a secondary clutch member on said power shaft in a position for engagement by said primary clutch member; a cam formed on said primary clutch member for moving said primary clutch member from engagement with said secondary clutch member; and means for yieldably forcing said primary clutch member toward said secondary clutch member.

9. A sensitometric device of the character described, including: light means for projecting a beam of light upon a sensitized photographic member; means for visibly indicating upon said member the boundary of the area subjected to said beam; a sensitometric tablet interposed in the path of said light; and control means for said light means for varying the intensity of said beam of light.

10. A sensitometric device of the character described, including: light means for projecting a beam of light upon a sensitized photographic member; light absorbing baffle members for defining the boundaries of said beam; a sensitometric member interposed in the path of said light; and control means for said light means for varying the intensity of said beam of light.

11. A sensitometric device of the character described, including: light means for projecting a beam of light upon a sensitized photographic member; baffle members surrounding said beam of light and providing a plurality of apertures, the cross-sectional area of the apertures nearer said photographic member being greater than the cross-sectional area of the apertures farther from said photographic member, said baffle members slanting towards said light means; a sensitometric member interposed in the path of said light; and control means for said light means for varying the intensity of said beam of light.

12. A sensitometric device of the character described, including: light means for projecting a beam of light; reflecting means for reflecting said beam of light onto a sensitized photographic member; masking means associated with said reflecting means for defining the cross-sectional area of said projected beam which is reflected; means for visibly indicating upon said member the boundary of the area subjected to said beam; a sensitometric tablet interposed in the path of said light; and control means for said light means for varying the intensity of said beam of light.

13. A sensitometric device of the character described, including: light means for projecting a beam of light upon a sensitized photographic member; a sensitometric tablet interposed in the path of said light; a shutter having a light aperture therein, said shutter being movable to pass or shut out said beam; a second shutter having a light aperture therein and movable to pass or shut out said beam, said shutter and said second shutter being adjustable relative to each other to vary the effective area of said apertures; and means for moving said shutter and said second shutter.

14. A sensitometric device of the character described, including: a housing; a sensitometric tablet in a wall of said housing; means for holding a sensitized photographic member in operative position relative to said tablet; a lamp in said housing adapted to project a light beam to said tablet; means for indicating upon said photographic member the limits of the area subjected to said beam of light; a shutter for controlling the passage of said light beam to said sensitometric tablet; a clutch member having one rotating part connected to said shutter; a constant speed power member connected to the other of the rotating parts of said clutch member; means for separating said rotating parts of said clutch member; and actuating means for freeing said last named means so as to permit engagement of said rotating parts of said clutch member.

In testimony whereof, I have hereunto set my hand at Los Angeles, California, this 3rd day of February, 1931.

ALBERT B. DORAN.